Feb. 26, 1924.
W. T. POWELL
IMPULSE TRANSMITTER
Filed May 17, 1919
1,484,739
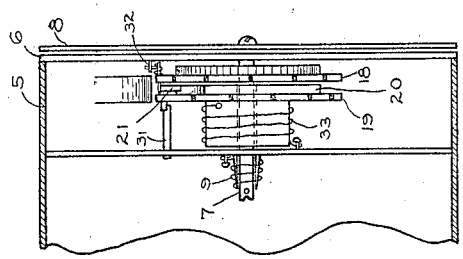
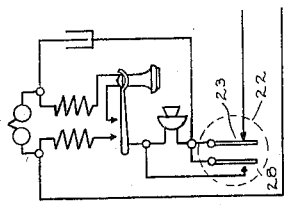
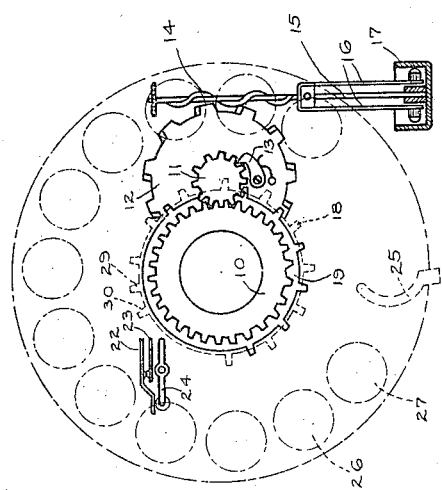
INVENTOR
WINFRED T. POWELL.
BY D. Clyde Jones.
ATTORNEY Patented Feb. 26, 1924.

1,484,739

UNITED STATES PATENT OFFICE.

WINFRED T. POWELL, OF ROCHESTER, NEW YORK, ASSIGNOR TO THE STROMBERG-CARLSON TELEPHONE MANUFACTURING COMPANY, OF ROCHESTER, NEW YORK, A CORPORATION OF NEW YORK.

IMPULSE TRANSMITTER.

Application filed May 17, 1919. Serial No. 297,742.

*To all whom it may concern:*

Be it known that I, WINFRED T. POWELL, a citizen of the United States, residing at Rochester, in the county of Monroe and State of New York, have invented certain new and useful Improvements in Impulse Transmitters, of which the following is a full, clear, concise, and exact description.

This invention relates to impulse transmitting devices, and more particularly to impulse transmitting devices for use in telephone systems.

In impulse transmitting devices or senders of the finger-hold type, it was formerly customary to provide for a maximum of ten impulses in a series. If it was desired to send a greater number of impulses in a series, it was necessary to greatly enlarge the size of the sender since the number of impulses transmitted was proportional to the distance through which the finger-hold member was rotated.

In accordance with the present invention it is proposed to provide means whereby the number of impulses transmitted by a sender or impulse transmitting device in certain instances is proportional to the distance through which a finger-hold member is operated, and in other instances the number of impulses transmitted is not proportional to the distance through which this finger-hold member is operated.

Another feature of the present invention is the arrangement whereby the number of impulses transmitted for a given series, is transmitted at a different speed from those of another series of impulses.

Specifically stated, the invention resides in means for transmitting series of impulses to digits 1 to 10 at one rate of speed, and the impulses of other series, such as 12 or 20 impulses, at a different rate of speed.

In the drawings, Fig. 1 represents a plan view of the sender of this invention, while Fig. 2 represents a side view of this style of sender with a portion of the casing broken away to expose the interior mechanism. Fig. 3 shows a substation circuit in which the sender of the present invention has been incorporated.

5 designates a circular casing on the front of which there is mounted a face-plate, or dial 6, bearing either numbers or other characters according to the designation of telephone lines. Through the center of this dial plate there is an opening through which a shaft 7 extends and in which this shaft is rotatably mounted. To one end of the shaft and raised slightly above the dial-plate is secured a circular finger-hold plate 8, having a number of holes spaced an equal distance apart about the periphery of the plate, one of these holes being positioned above a character on the dial-plate when the finger-hold member is in normal position. The shaft 7 is provided with a spring 9, which is wound up when the finger-hold member 8 and its shaft are rotated in a clockwise direction. Fixed to the shaft 7 is a gear wheel 10 arranged to mesh with a pinion 11. A gear 12 mounted on a common axis with the pinion 11, is provided with a pawl 13, so that this gear and pinion will only rotate together as the dial moves back to normal position. The gear 12 engages a worm 14, and as this worm and gear operate, a shaft 15 is operated thereby to cause the members 16 and the barrel 17 of a governor to control the speed of the retrograde movement of the finger-hold member. The shaft 7 is also provided with two impulse wheels 18 and 19, the first being fixed to the shaft, and the second mounted to rotate thereon. A disk 20 is secured to the impulse wheel 19, and is provided with a notch positioned to be engaged by pawl 21 carried on the impulse wheel 18 when certain digit impulses are to be transmitted. Pin 31 serves as a stop for impulse wheel 19 and pin 32 operates to disengage pawl 21 from the notch in disk 20. Spring 33 restores impulse wheel 19 to normal.

By reference to Fig. 1, it will be noted that the impulse wheel 19 is provided with 8 teeth, whereas the impulse wheel 18 is provided with 12 teeth. It will also be seen that the teeth of the impulse wheel 18 are spaced intermediate of the teeth of the impulse wheel 19. Two impulse springs 22 and 23, are provided which are arranged to be separated by the operation of the lever 24 which is engaged by the teeth of the impulse wheels in their retrograde movement.

In operating the sender, the subscriber places his finger in the opening of the finger-hold plate over the character indicating the number of impulses to be transmitted and rotates this finger-hold plate until his finger strikes the stop 25. This operation winds up the spring 9 to rotate the finger-hold plate and the shaft with the impulse wheels thereon back to normal position. While the device is being returned to normal, the gear 10 engages the pinion 11, and in this instance the pawl 13 locks the pinion to the wheel 12, so that the worm 14 turns the shaft 15 to operate the governor. This governor controls the speed of the number wheels and, therefore, the rate at which the impulses are transmitted. While the gear 10 is being returned to normal, the teeth of the impulse wheels engage the end of a lever 24, and cause it to break the connection between contact springs 22 and 23.

When any number of digit impulses up to 12 are transmitted, only the impulse wheel 18 is affected. If it is desired to send a number of impulses greater than 12, then the finger will be placed in the finger-hold 27. In this case the finger-hold plate, and consequently the impulse wheel 18, will be rotated sufficiently so that the pawl 21 will engage the notch in disk 20, and thereby lock the impulse wheels 18 and 19 together. If the finger is placed in hold 26, 12 impulses will be transmitted, while if the finger is placed in hold 27, 20 impulses will be transmitted.

Since the spacing of the teeth on the impulse wheel 18, with the exception of teeth 29 and 30 for sending 12 impulses is greater than the space between the teeth on the impulse wheels 18 and 19 when acting as a unit; therefore when the present sender is employed to transmit impulses of the decimal order, the impulses will be transmitted more slowly than when the sender is employed to transmit impulses of the non-decimal order.

Fig. 3 shows a well known form of substation circuit with the normally closed interrupter springs 22 and 23 of the impulse transmitter of the present invention incorporated therein. At 28, there is shown a well known shunting spring and contact which are normally open except when shunting the transmitter during the transmission of impulses.

It will be understood that the present disclosure is merely typical, and that there may be many variations in structure and operation without departing from the spirit of the present invention.

What I claim is:—

1. In an impulse transmitting device, a number or character plate, a member movable with respect to said plate, and means automatically and variably controlled only by said member for transmitting a variable number of impulses on a decimal and non-decimal basis.

2. In an impulse transmitting device, interrupter contacts, a plurality of movable impulse devices for operating said contacts, one of said devices being operated to cause said contacts to transmit impulses of a decimal order, the other impulse device cooperating with the first impulse device thereafter to control said contacts in sending a variable number of impulses of a non-decimal order, a member for operating said impulse devices, and means automatically and variably controlled only by the operation of said member for variably operating said impulse devices.

3. In an impulse transmitting device, a dial having characters for designating telephone lines, a finger-hold member rotatably mounted adjacent said dial, a plurality of interrupter disks variably operated only by said finger-hold device, impulse contacts controlled by said disks, and means for operating said disks, only one of said disks being operated when a small number of impulses is to be transmitted and both disks being operated when a large number of impulses is to be transmitted.

4. In an impulse transmitting device, a dial having characters for designating telephone lines, a finger-hold member rotatably mounted adjacent said dial, a plurality of interrupter disks variably operated only by said finger-hold device, impulse contacts controlled by said disks, one of said disks being operated when a small number of impulses is to be transmitted, and all of said disks being operated when a large number of impulses is to be transmitted.

5. In an impulse transmitter, a character plate, a movable finger hold member having openings spaced at substantially equal distances apart over said character plate, means including the first means controlled by said member for transmitting impulses, the number of said impulses being proportional to the distance through which said member is moved, and other means variably controlled only by said member for transmitting impulses, the number of which is disproportional to the distance through which said member is moved.

6. In an impulse transmitting device, a dial bearing characters for designating telephone lines, a rotatable finger-hold device having openings spaced at substantially equal distances apart about its periphery through which openings said characters are visible, and means variably controlled only by said device for transmitting impulses, the number of said impulses in one instance being proportional to the distance through which said device is moved, and in another instance the number of said impulses being disproportional to the distance through which said device is moved.

7. In an impulse transmitter, a movable member, means controlled by said member for transmitting impulses, the number of said impulses being proportional to the distance through which said member is moved, and other means including said first means variably controlled only by said member for transmitting impulses, the number of which is disproportional to the distance through which said member is moved.

8. In an impulse transmitter, a character plate, a member movable with respect to said character plate, means controlled by said member for transmitting impulses, the number of said impulses being proportional to the distance through which said member is moved, and other means including said first means variably controlled only by said member for transmitting impulses, the number of which is disproportional to the distance through which said member is moved.

9. In an impulse transmitter, a character plate, a member variably movable with respect to said character plate, impulse wheels provided with teeth, the teeth of one wheel being positioned at a point intermediate to the teeth of the second wheel, impulse springs positioned to be actuated by the teeth on said wheels and means including said variably movable member for actuating one or both of said impulse disks.

10. In an impulse transmitter, a character plate, a finger hold member variably movable with respect to said character plate, impulse disks arranged to be controlled from said finger hold member, one of said impulse disks being always operated in response to the operation of said finger hold member and a second impulse disk being operated in response to the maximum operation of said finger-hold member, and a set of impulse springs controlled by said disks.

11. In an impulse transmitter, a dial bearing characters for designating telephone lines, a rotatable finger hold device having openings spaced about its periphery through which openings said characters are visible, a plurality of impulse cams arranged to be controlled from said finger hold member, one impulse cam operating independently in response to a certain adjustment of said movable member, a second cam actuated by the first cam in response to another adjustment of said movable member, and impulse sending contacts controlled by said impulse cams.

12. In an impulse transmitter, a dial bearing characters for designating telephone lines, a rotatable finger hold member having openings spaced about its periphery through which openings said characters are visible, a shaft to which said member is secured, bearings for said shaft, an impulse cam secured to said shaft, a second impulse cam rotatably mounted on said shaft, a gear secured to said shaft, a spring motor arranged to be wound up during the clockwise adjustment of said finger hold member for returning the shaft and said member in a counter-clockwise direction, a gear train including a governor arranged to be connected to said shaft through said gear during the counter-clockwise movement of said finger hold member for causing said member to rotate backward at a predetermined speed, a pawl and ratchet arrangement for connecting said impulse cams together under certain conditions and an impulse device controlled by said impulse cams.

In witness whereof, I hereunto subscribe my name this 14th day of May, A. D. 1919.

WINFRED T. POWELL.